BEST AVAILABLE COPY

Jan. 1, 1963 H. G. STENGER ET AL Des.-Re. 25,316

BOTTLE

Original Filed July 19, 1960 Orig. Des. 189,996

INVENTORS
HANS G. STENGER
BY WILLIAM E. FILLMORE
SPENCER L. BLAYLOCK JR
& W. A. SCHAICH
ATTORNEYS

BEST AVAILABLE COPY

United States Patent Office

Re. 25,316
Reissued Jan. 1, 1963

25,316
BOTTLE

Hans G. Stenger, Lambertville, Mich., and William E. Fillmore, Toledo, Ohio, assignors to Owens-Illinois Glass Company, Toledo, Ohio, a corporation of Ohio Original Design Patent No. 189,996, dated Mar. 28, 1961, Ser. No. 61,420, July 19, 1960, for 14 years. Application for reissue June 5, 1961, Ser. No. 65,627
Term of patent 14 years
(Cl. D58—5)

Matter enclosed in heavy brackets [ ] appears in the original patent but forms no part of this reissue specification; matter printed in italics indicates the additions made by reissue.

Figure 1:
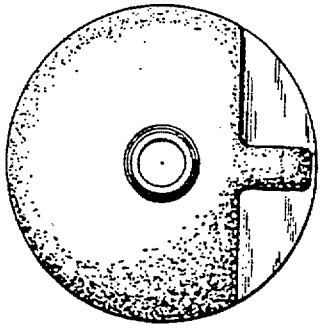
FIG. 1 is a top plan view of a bottle showing our new design.
Figure 2:
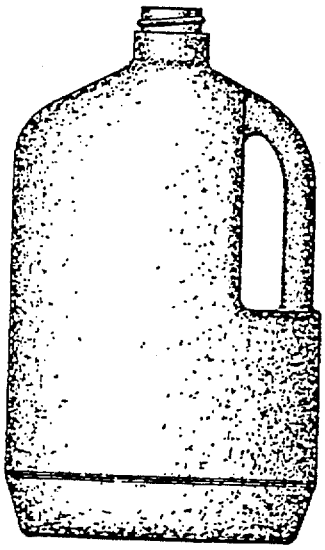
FIG. 2 is an elevational view thereof.
Figure 3:
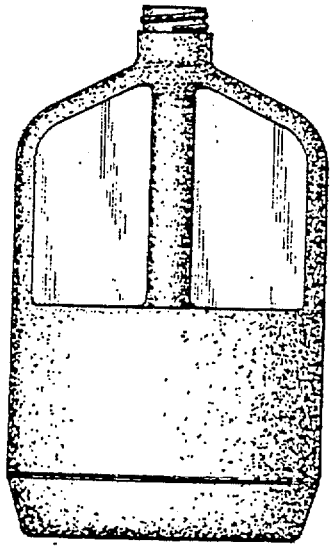
FIG. 3 is an elevational view with the bottle rotated 90° from the position shown in FIG. 2.

The side not shown is the same as the side shown and the front is plain.

[The drawing is shaded to show contrasting colored areas.]

*The drawing is shaded to indicate curved and plane surfaces rather than any textural or color contrast.*

We claim:

The ornamental design for a bottle, substantially as shown and described.

References Cited in the file of this patent

UNITED STATES PATENTS

| | | |
|---|---|---|
| D. 146,128 | Billups | Dec. 31, 1946 |
| D. 172,716 | Musel et al. | July 27, 1954 |
| 265,540 | Robinson et al. | Oct. 3, 1882 |